United States Patent
Amin-Sanayei et al.

(10) Patent No.: US 9,457,315 B2
(45) Date of Patent: Oct. 4, 2016

(54) FLUOROPOLYMER GAS SEPARATION FILMS

(75) Inventors: Ramin Amin-Sanayei, Malvern, PA (US); Caiping Lin, West Hartford, CT (US); Cedric Airaud, Orsay (FR); John Schmidhauser, Paoli, PA (US); Scott R. Gaboury, Blue Bell, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 13/985,312

(22) PCT Filed: Feb. 17, 2012

(86) PCT No.: PCT/US2012/025567
§ 371 (c)(1),
(2), (4) Date: Aug. 14, 2013

(87) PCT Pub. No.: WO2012/112840
PCT Pub. Date: Aug. 23, 2012

(65) Prior Publication Data
US 2013/0312604 A1 Nov. 28, 2013

Related U.S. Application Data

(60) Provisional application No. 61/444,175, filed on Feb. 18, 2011.

(51) Int. Cl.
*B01D 53/22* (2006.01)
*B01D 69/02* (2006.01)
*B01D 71/34* (2006.01)
*B01D 71/36* (2006.01)
*B01D 39/04* (2006.01)
*B01D 39/16* (2006.01)
*B01D 71/32* (2006.01)

(52) U.S. Cl.
CPC ............ *B01D 53/228* (2013.01); *B01D 39/04* (2013.01); *B01D 39/1692* (2013.01); *B01D 53/22* (2013.01); *B01D 69/02* (2013.01); *B01D 71/32* (2013.01); *B01D 71/34* (2013.01); *B01D 71/36* (2013.01); *B01D 2257/504* (2013.01); *B01D 2258/0283* (2013.01); *B01D 2325/20* (2013.01); *Y02C 10/10* (2013.01)

(58) Field of Classification Search
CPC .. B01D 39/04; B01D 39/1692; B01D 53/22; B01D 53/228; B01D 69/02; B01D 71/32; B01D 71/34; B01D 71/36; B01D 2257/504; B01D 2258/0283; B01D 2325/20; Y02C 10/10
USPC ..................... 95/43, 45, 51; 96/4, 7
See application file for complete search history.

(56) References Cited

U.S. PATENT DOCUMENTS

| | | | |
|---|---|---|---|
| 5,411,805 A * | 5/1995 | Magill ............... | B01D 67/0027 428/220 |
| 6,013,688 A | 1/2000 | Pacheco et al. | |
| 6,110,309 A | 8/2000 | Wang et al. | |
| 6,165,253 A * | 12/2000 | Sirkar ................... | B01D 53/14 86/10 |
| 6,607,856 B2 * | 8/2003 | Suzuki et al. ................. | 429/483 |
| 6,780,935 B2 | 8/2004 | Hedhli et al. | |
| 7,208,227 B2 * | 4/2007 | Tomihashi et al. ........ | 428/411.1 |
| 7,811,359 B2 | 10/2010 | Tandon et al. | |
| 7,820,774 B2 * | 10/2010 | Aida et al. ..................... | 526/255 |
| 8,007,573 B2 * | 8/2011 | Bansal ................ | B01D 53/228 422/180 |
| 8,337,725 B2 * | 12/2012 | Abusleme .............. | B01D 69/02 252/511 |
| 8,366,811 B2 * | 2/2013 | Ophir ................... | B01D 61/362 429/414 |
| 8,481,607 B2 * | 7/2013 | Aruga et al. .................. | 522/156 |
| 8,528,746 B2 * | 9/2013 | Kim ....................... | B01D 65/08 210/490 |
| 8,586,338 B2 * | 11/2013 | Etzel ...................... | B01D 69/12 210/679 |
| 2002/0170430 A1 | 11/2002 | Baker et al. | |
| 2004/0092661 A1 | 5/2004 | Hedhli et al. | |
| 2004/0147666 A1 * | 7/2004 | Tomihashi et al. ........... | 524/545 |
| 2006/0226690 A1 * | 10/2006 | Neale ............................ | 297/408 |
| 2006/0292418 A1 | 12/2006 | Akiyama et al. | |
| 2008/0032080 A1 * | 2/2008 | Faulkner et al. .......... | 428/36.91 |
| 2008/0078290 A1 | 4/2008 | Hagg et al. | |
| 2008/0173179 A1 | 7/2008 | Tandon et al. | |
| 2008/0220274 A1 | 9/2008 | Cohen et al. | |
| 2009/0301307 A1 | 12/2009 | Sugiyama et al. | |
| 2010/0056652 A1 * | 3/2010 | Duong ............... | B01D 67/0088 521/53 |
| 2010/0209693 A1 * | 8/2010 | Hester .................. | B01D 67/009 428/315.5 |
| 2010/0224066 A1 * | 9/2010 | Ophir ..................... | A61B 5/097 96/10 |
| 2011/0253621 A1 * | 10/2011 | Kim ...................... | B01D 65/08 210/500.39 |
| 2012/0247327 A1 * | 10/2012 | Omole ............... | B01D 53/1425 95/51 |
| 2014/0138314 A1 * | 5/2014 | Liu ..................... | B01D 67/0018 210/650 |
| 2014/0150648 A1 * | 6/2014 | Liu .................... | B01D 67/0018 95/51 |
| 2014/0165837 A1 * | 6/2014 | Kimura .................. | B01D 71/82 96/12 |
| 2014/0364567 A1 * | 12/2014 | Balsara .................. | B01D 71/80 525/106 |
| 2015/0053611 A1 * | 2/2015 | Wang ..................... | B01D 71/64 210/500.23 |

(Continued)

OTHER PUBLICATIONS

"polymer" American Heritage Dictionary of the English Language, Fifth Edition. 2011 by Houghton Mifflin Harcourt Publishing Company, 1 pg <http://www.thefreedictionary.com/polymer>.*

(Continued)

*Primary Examiner* — Anthony Shumate
(74) *Attorney, Agent, or Firm* — Thomas F. Roland

(57) ABSTRACT

The invention relates to a novel film, membrane or powder media made from fluoropolymers, especially PVDF-based and ETFE-based polymers, which are suitable for separating gases, especially carbon dioxide, from a gas mixture. The novel film has good selectivity, high permeance, good mechanical properties, and exhibits a high resistance to oxidant and acid attack. The separation film is especially useful in harsh and corrosive environments.

14 Claims, No Drawings

(56) References Cited

U.S. PATENT DOCUMENTS

| | | | |
|---|---|---|---|
| 2015/0209776 A1* | 7/2015 | Gin | C08F 12/26 95/51 |
| 2015/0217224 A1* | 8/2015 | Lien | B01D 53/228 585/818 |
| 2015/0273389 A1* | 10/2015 | Liu | B01D 53/228 95/50 |

OTHER PUBLICATIONS

El-Hibri, M. J., et al., "Gas Transport in Poly(vinylidene Fluoride): Effects of Uniaxial Drawing and Processing Temperature", *Journal of Applied Polymer Science*, vol. 31, 2533-2560 (1986), John Wiley & Sons, Inc.

\* cited by examiner

FLUOROPOLYMER GAS SEPARATION FILMS

This application claims benefit, under U.S.C. §119 or §365 of PCT Application No. PCT/US2012/025567, filed Feb. 17, 2012, and U.S. Provisional Application No. 61/444, 175, filed Feb. 18, 2011.

FIELD OF THE INVENTION

The invention relates to a novel media made from fluoropolymers, especially PVDF-based and ETFE-based polymers, which are suitable for separating gases, especially carbon dioxide, from a gas mixture. The novel media has good selectivity, high permeance, good mechanical properties, and exhibits a high resistance to oxidant and acid attack. The media can be used in many forms, including as a film, membrane of powder. The fluoropolymer separation media is especially useful in harsh and corrosive environments.

BACKGROUND OF THE INVENTION

Carbon dioxide ($CO_2$) has been identified as the main source of greenhouse gas contributing to the climate changes. Therefore, capturing and sequestering $CO_2$ has been recognized as a potential solution to climate changes caused by greenhouse gases. Billions of tons of $CO_2$ are annually emitted by fuel combustion processes, where the vast majority is emitted from power plants. Post-combustion $CO_2$ mitigation is an attractive option for reducing the impact of greenhouse gasses that emitted to the atmosphere. A current method for capturing $CO_2$ involves chemical absorption in an amine solution. This process is costly and requires large amounts of time and space.

Efficient separation technologies are required to remove carbon dioxide from flue gas streams of power plants especially coal burning power plants. Membrane-based processes for gas separation are attractive because they are (i) highly energy-efficient, (ii) simple to operate and maintain, (iii) compact and modular, allowing for easy retrofit to existing power plants. One difficulty for the use of membrane technology is that flue gas, especially from coal burning power plants, contains metal oxides which are acidic in nature and also $SO_x$ and $NO_x$ gases which could attack the membrane and deteriorate its performance.

US 20080078290 describes a gas separation membrane formed from a blend of polyvinylalcohol and polyvinylamine. Although these membranes showed separation properties, but are not fluorinated, as a result, they would be susceptible to acid attack results in performance deterioration.

Polyvinylidene fluoride (PVDF) membranes are being used in microfiltration and ultrafiltration applications, and have been described in US patents such as U.S. Pat. Nos. 6,013,688, 6,110,309, and US 2008/0220274.

U.S. Pat. No. 5,490,931 describes 2-layer hollow fiber fluid separation membranes having a fluoropolymer layer, said fluoropolymer having a nitrogen-containing backbone. U.S. Pat. No. 7,811,359 describes a multi-layer membrane for the separation of carbon dioxide, in which an expanded polytetrafluoroethylene layer is used as a support layer for a polyorganosiloxane active layer.

US 20090301307 describes a gas separation membrane that comprises a porous support membrane and a gas-separating thin film that comprises a gas-separating resin as a main component. The polymeric microporous membrane contains one or two types of ultrahigh molecular weight polyethylene and polypropylene as porous support. The gas-separating membrane resin is made of a copolymer of perfluoro-2,2-dimethyl-1,3-dioxol and tetrafluoroethylene (TFE). pTFE is not a polar material, and therefore its selectivity is diminished compared to PVDF or ETFE of the present invention.

There remains a need to develop separating membranes or films that not only do not suffer from the problems highlighted above, but further possess excellent gas selectivity and high permeance for targeted gas.

Surprisingly, a media for gas separation has now been developed, formed from polyethylene tetrafluoro ethylene (ETFE)-based and/or polyvinylidene fluoride (PVDF)-based polymers, that exhibits excellent separation properties, excellent mechanical properties, and withstands acid, $NO_x$ and $SO_x$ attacks. The media, especially in the form of a film or membrane does not suffer from performance deterioration after being exposed to $NO_x$ and $SO_x$ for long period of time.

SUMMARY OF THE INVENTION

The invention relates to a polymeric media for the separation of carbon dioxide from a mixture with other gases, in the form of a film, membrane or powder, where the film or membrane comprises, as the active layer, a polyvinylidene fluoride (PVDF)-based polymer, a polyethylene tetrafluoretylene (ETFE)-based polymer, or a mixture thereof.

The invention further relates to the use of the polymeric film for separating carbon dioxide from a mixture of gases generated by the combustion of fossil fuels.

DETAILED DESCRIPTION OF THE INVENTION

Unless stated otherwise, all percentages, parts, ratios, etc. are by weight, and molecular weights are weight average molecular weight.

The fluoropolymer media of the invention, can be used in any form, especially in the form of a film, membrane or powder. Films are especially preferred.

A film of the invention is differentiated from a membrane. A film—as defined in Hawley's The Condensed Chemical Dictionary, $8^{th}$ Ed.—is "a continuous sheet" those "value depends on its being 100% continuous, i.e. without holes or cracks since it must form an efficient barrier."; while a membrane is "a thin sheet through the apertures of which small molecules can pass". While it is well known in the art that PVDF can be used to provide a good barrier film, it has now been unexpectedly found that PVDF films can also be effectively used for gas separator, especially with very thin films, and when the PVDF film is modified by using a PVDF copolymer, or the PVDF film is used at an elevated temperature. While not being bound by any particular theory, it is believed that the $CO_2$ can dissolve on one surface of the film, diffuse through the film, and be released or come out of solution on the other surface of the PVDF film.

The invention relates to gas separation films having as an active material a fluoropolymer, particularly a PVDF-based polymer, an ETFE-based polymer, or a mixture thereof. The films are thin solid films that are especially useful for the separation of $CO_2$ from a gaseous mixture in harsh environments. PVDF and ETFE polymers and copolymers are preferred, as their dipole moments are similar to the dipole moment of $CO_2$.

The fluoropolymer films of the invention include especially PVDF-based polymers, and ETFE-based polymers, or a mixture thereof. By "based" is meant that the polymer contains at least 10 mole percent of PVDF and/or ETFE, such as in the case where the other up to 90 mole percent is 2,3,3,3-tetrafluoro-propene, and/or 3,3,3-trifluoro-propene. Preferably, the polymer contains more than 50 mole percent of monomer units of VDF and/or ETFE respectively. "Fluoropolymer", as used herein means a polymer having in its backbone only F, C, H, and O atoms. The fluoropolymer may be functionalized, though such functionality may reduce the polymer stability against $SO_x$ and $NO_x$.

Poly (vinylidene fluoride), PVDF has achieved a high level of usage in the recent years due to excellent resistance to chemical attacks, especially acid attack weathering elements, and oxidants, as well as special properties such as ease of processability and flexibility.

The term "vinylidene fluoride polymer" or "PVDF-based polymers" used herein includes both normally high molecular weight homopolymers and copolymers (meaning two or more types of monomer units) within its meaning. Such copolymers include those containing at least 50 mole percent of vinylidene fluoride copolymerized with at least one comonomer selected from the group consisting of tetrafluoroethylene, trifluoroethylene, chlorotrifluoro ethylene, hexafluoropropene, 2,3,3,3-tetrafluoro-propene, 3,3,3-trifluoro-propene, vinyl fluoride, pentafluoropropene, perfluoromethyl vinyl ether, perfluoropropyl vinyl ether and any other monomer that would readily copolymerize with vinylidene fluoride. Particularly preferred are copolymers composed of from at least about 70 and up to 99 mole percent vinylidene fluoride, and correspondingly from 1 to 30 percent tetrafluoroethylene, such as disclosed in British Patent No. 827,308; about 70 to 99 percent vinylidene fluoride and 1 to 30 percent hexafluoropropene (see for example U.S. Pat. No. 6,586,547); and about 70 to 99 mole percent vinylidene fluoride and 1 to 30 mole percent trifluoroethylene, 2,3,3,3-tetrafluoro-propene, and/or 3,3,3-trifluoro-propene. Terpolymers of vinylidene fluoride with hexafluoropropene and tetrafluoroethylene such as described in U.S. Pat. No. 2,968,649 are also preferred.

In a similar manner, ETFE-based polymers includes both normally high molecular weight homopolymers and copolymers (meaning two or more types of monomer units) within its meaning. Such copolymers include those containing at least 50 mole percent of ethylene tetrafluoroethylene copolymerized with at least one comonomer selected from the group consisting of vinylidene fluoride, trifluoroethylene, chlorotrifluoro ethylene, hexafluoropropene, 2,3,3,3-tetrafluoro-propene, 3,3,3-trifluoro-propene, vinyl fluoride, pentafluoropropene, perfluoromethyl vinyl ether, perfluoropropyl vinyl ether and any other monomer that would readily copolymerize with ETFE.

PVDF homopolymer is a semi-crystalline polymer. The crystalline phase has a very low permeability to gases and fluids as well as a low swelling in many solvents. The barrier properties of PVDF are well known, as described in article published in J. Appl. Poly. Sci., vol 31, Page 2533, (1986). The high level of intrinsic crystallinity, typically near 60%, provides stiffness, toughness, and permeation resistant properties.

The crystallinity of PVDF can be reduced through the incorporation of various fluorinated comonomers at low levels, typically about 5-50 wt %. The copolymer (or terpolymer) produced can vary in crystallinity from highly crystalline PVDF that cannot be processed easily, down to a totally amorphous elatomeric polymer with poor mechanical properties. Copolymers of vinylidene fluoride, for examples, with hexafluoro-propylene (HFP), with 2,3,3,3-tetrafluoro-propene, and/or with TFE are thermoplastic polymers that can be easily processed to form films, membranes, or molded parts. The overall comonomer content and as well as its sequence distribution, controls the morphology and crystalline-amorphous content of the PVDF-based polymers and their ultimate transport properties.

Pure, highly crystalline PVDF film has a limited permeation of $CO_2$ due to the torturous path. On the other hand, low crystallinity or amorphous PVDF polymers have much higher rate of $CO_2$ transport. Thus, the diffusion rate across the film could increase by reducing of crystallinity. Films made of low crystallinity or amorphous PVDF polymers with sufficient molecular weight and reasonable mechanical properties are surprisingly found to be suitable as gas separating films. The comonomers of choice for reducing crystallinity include, but are not limited to, HFP, 2,3,3,3-tetrafluoro-propene, and/or TFE. These provide high molecular weight copolymers with wide range of composition and morphologies. High molecular weight for polymers is related to the melt viscosity. In the present invention, the melt viscosity of the polymer should be from 0.5 to 50 Kpoise, preferably from 2-30 Kpoise. By reasonable mechanical properties is meant that the polymer can withstand the temperature and pressure of the operating conditions, and can be measured by different means, such as Young's modulus. A useful range of Young's modulus would be from 50-5000 psi.

There are several advantages of using high molecular weight amorphous or nearly amorphous PVDF and/or EFTE-based polymers in as separation films of the invention. These include:

1. Resistance to acid and oxidant attack;
2. Superb weatherability;
3. Easy dissolution and thin film casting,
4. High mechanical integrity due to high degree of entanglements,
5. Defect-free thin film due to high solution viscosity, and
6. Ease of cross-linking of film by E-beam although it might not be necessary The film of the invention could be used in pure form or as an alloy with other polymers, to enhance gas transport or improve mechanical properties. PVDF exhibits an unusual compatibility with other polymers having strong polar groups or carbonyl groups such as acrylics; and is particularly miscible with short esters of methacrylic acid. This miscibility aspect led to the development of many alloys and mixed systems for coatings, porous membranes, and films. While it is preferred that the PVDF or EFTE-based polymer be used by itself, and not as a blend or alloy, when used in an alloy preferably at least 50 weight percent, and more preferably at least 75 weight percent of the blend or alloy is PVDF or ETFE-based polymers.

The alloy structure can be tailor-made to produce an inter-penetrated structure, to form an intimate blend, or to form a co-continuous morphology by tuning the acrylic phase and appropriate blending processes.

Another approach is to form alloys of PVDF polymers with other compatible or miscible polymers that are $CO_2$-philic, such as polyethylene oxide, polycarbonates, poly (acrylamide) or poly(methacrylamide) to further enhance $CO_2$ selectivity and permeation without compromising acid and oxidant resistance of the composite film.

Gas separation membranes or films typically take two forms, supported or unsupported. The films of the invention could be used in either form, depending on the level of crystallinity. If the polymer contains sufficient crystallinity it could be used unsupported. Low crystallinity polymer may require supports. Suitable supports are known in the art and are ones that are porous to the gas being transported. One method of support is to form a multi-layer film having the PVDF or ETFE-based polymer film as one layer.

Films of the PVDF-based and ETEF-based polymers of the invention could be formed by a solvent cast process. The polymer would be dissolved in an organic solvent or mixture thereof. The polymer concentration in the solution ranging from 1 to 40 wt %, preferably 5 to 25 wt % to achieve proper solution viscosity for casting.

Solvents useful with PVDF-based polymers, especially copolymers with hexafluoro-propylene (HFP) and/or with 2,3,3,3-tetrafluoro-propene inculde but are not limited to, N-methyl-2-pyrrolidone (NMP), dimethylformamide (DMF), N,N-dimethylacetamide (DMAc), dimethylsulfoxide (DMSO), hexamethylphosphamide, dioxane, tetrahydrofuran (THF), tetramethylurea, triethyl phosphate (TEP), trimethyl phosphate (TMP), dimethyl succinate, diethyl succinate and tetraethyl urea, acetone, and other organic solvents.

To ensure dissolution and thorough mixing, stirring and sonication can be used at this point. The solution can also be filtered.

Casting of the solution is carried out using known techniques. For the manufacture of supported and/or unsupported films, various options are available for producing thin films for separation of gasses. These include dip coating, vapor deposition, spin coating, and spray coating.

The thickness of the formed film will vary depending on the concentration of the solution, higher concentration solutions giving thicker films. Thickness can be adjusted however using a casting knife.

In general, the thickness of the actual dense film of the invention may be in the range 100 nm to 100 micron, preferably 250 nm to 10 micron, and most preferably 500 run to 5 microns. Thin films tend to have higher permeance values but also are not as strong. Proper melt viscosity of fluoropolymers of the invention provides an excellent balance of strength and permeance. The preferred melt viscosity range is from 0.5 to 50 kilopoise, preferably from 1 to 35 kilopoise, as measured by ASTM D3835 at 450° F. at 100 sec$^{-1}$.

After formation of the film the solvent(s) is removed, e.g. by evaporating the solvent(s). This can be achieved using gentle heat when necessary. Disclosed film has good selectivity for $CO_2$ over $N_2$, high permeance, and good mechanical properties and exhibits a high resistance to oxidant and to acid attack. Preferably the $CO_2$ selectivity over $N_2$ will be greater than 2, preferably greater than 3 and more preferably greater than 5.

The film of this invention could be further be used on forms including but not limited to flat sheet, spiral wind, hollow fiber, asymmetric hollow fiber, and/or any other forms.

Tests have shown that films of the invention can be used for long time without any significant loss of selectivity or permeance even when subjected to $NO_x$ and $SO_x$.

The gas separation film of the invention could also be used for the separation of other gases, and especially where the separation will occur in harsh and corrosive conditions.

Membranes can be formed from solution by many different procedures familiar to those skilled in the art. Solution casting with heating is a preferred method. A quantity of the polymer solution is placed on an appropriate substrate. A sharp metal knife is then drawn across the substrate with a gap between the knife and the substrate. The thickness of this gap and the viscosity of the polymer blend solution control the thickness of the formed film. The thickness of the formed film is dependent on the end-use of the material, and can vary from 1.0 μm to 2.0 mm. This 'wet' film is then dried in a air-circulating oven at elevated temperature.

Powders are formed from a fleuoropolymer emulsion by means known in the art, such as spray-frying and freeze-drying.

EXAMPLES

Permeation Testing

Permeance of the films was measured with an apparatus equipped gas supply line; the chosen gases may be mixed in any ratios in a gas flow line, in which flow, pressures and temperatures are controlled. Either the retentate stream, or the permeate stream, may be lead to a gas chromatograph (GC) for analysis of the composition. The use of this equipment will be familiar to one of skill in the art.

The film was placed on a porous metal disk in a flat type film cell and was sealed with rubber O-rings. All experiments were conducted at a constant temperature noted in the examples.

The permeance (flux) was calculated in the unit of barrer=$1\times10^{-10}$ $CM^3(STP)\cdot cm/(cm^2\cdot s\cdot cmHg)$. Selectivity for the reported experiments was calculated from the ratios of flux of pure gasses or from compositions of gases in feed side and permeate side.

Examples 1-5

Films were cast from a N-methyl pyrrolidone (NMP) solution using a Matis Coater. Polymer concentrations were between 10 to 16%. HFP=hexafluoropropene, and "yf" is 2,3,3,3-tetrafluoro propene.

In order to cast good film, a piece of aluminum foil was cut and placed flat on a metal frame of coater. The height of the doctor knife was adjusted according to the targeted thickness. The aluminum foil was wiped with acetone to ensure no foreign particle was present. A predetermined amount of polymer solution was placed closed to the edge of the doctor knife, and spread automatically by coater. The polymer was dried in the oven of the coater for 10 min at 185° C. After cooling, the film with aluminum support was submerged in D.I water to lift the film up without damaging it. The thickness of the formed film will vary depending on the concentration of the solution and the distance between the casting knives and aluminum supports. The thicknesses of films were kept below 25 micron (1 mil) closer to 15 micron (½ mil). The results of $CO_2$, N2, and O2 permeation are tabulated in Table 1.

TABLE 1

| Ex | Type | Co-monomer wt % | Melt Viscosity | Temp ° C. | N2 (barrier) | O2 (barrier) | CO2 (barrier) | O2/N2 selectivity | CO2/N2 selectivity |
|---|---|---|---|---|---|---|---|---|---|
| 1 | PVDF | 0 | 36.3 | 60 | 0.19 | 0.40 | 2.9 | 2.1 | 15 |
| | | | | 80 | 0.50 | 1.3 | 7.0 | 2.6 | 14 |
| | | | | 100 | 1.2 | 3.1 | 15 | 2.6 | 12 |
| | | | | 120 | 3.5 | 8.6 | 32 | 2.5 | 9.1 |

TABLE 1-continued

| Ex | Co-monomer Type | Co-monomer wt % | Melt Viscosity | Temp ° C. | N2 (barrier) | O2 (barrier) | CO2 (barrier) | O2/N2 selectivity | CO$_2$/N2 selectivity |
|---|---|---|---|---|---|---|---|---|---|
| 2 | VDF/HFP | 24.4 | 17.1 | 23 | 0.073 | 0.49 | 2.5 | 6.7 | 34 |
|   |         |      |      | 35 | 0.22  | 1.2  | 5.9 | 5.5 | 27 |
|   |         |      |      | 50 | 0.68  | 2.1  | 14  | 3.1 | 21 |
|   |         |      |      | 60 | 1.4   | 3.8  | 23.5| 2.7 | 17 |
| 3 | VDF/HFP | 34.3 | 15.22| 23 | 0.15  | 0.61 | 3.4 | 4.1 | 23 |
|   |         |      |      | 35 | 0.38  | 1.2  | 8.8 | 3.2 | 35 |
| 4 | VDF/yf  | 14.9 | 23.36| 35 | 0.046 | 0.23 | 1.9 | 5.0 | 41 |
|   |         |      |      | 45 | 0.14  | 0.45 | 4.0 | 3.2 | 29 |
|   |         |      |      | 55 | 0.30  | 0.87 | 6.8 | 2.9 | 23 |
|   |         |      |      | 65 | 0.53  | 1.6  | 12  | 3.0 | 23 |
|   |         |      |      | 75 | 1.2   | 2.7  | 19  | 2.2 | 16 |
| 5 | VDF/yf  | 21.4 | 20.15| 35 | 0.087 | 0.31 | 2.9 | 3.6 | 33 |
|   |         |      |      | 45 | 0.22  | 0.69 | 6.2 | 3.1 | 28 |
|   |         |      |      | 55 | 0.51  | 1.3  | 9.8 | 2.5 | 19 |
|   |         |      |      | 65 | 0.90  | 2.5  | 19  | 2.8 | 21 |

Copolymer comonomer content determined by $^{19}$F NMR
Melt viscosity measured by capillary rheometer at 100 s$^{-1}$ shear rate and 232° C.
1 barrier = 1 × 10$^{-10}$ cm$^3$(STP) · cm/(cm$^2$ · s · cmHg)

Example 6

Stability testing

Gas permeation properties were measured on the film of Example 2. Example 6a is a control, before any stability testing. Example 6b was measured after exposure to 250 ppm NO in a CO$_2$/N$_2$ mixture for 6.75 days. One can see that there was little effect on gas permeability from this exposure Example 6c was measured after 7 days exposure to 250 ppm NO in a CO$_2$/N$_2$ mixture, but before exposure to 1% H$_2$O vapor. Example 6d is for the sample of 6c exposed further to 7 days of 1% H$_2$O vapor in a CO$_2$/N$_2$ mixture.

| Ex. | Temp, ° C. | Gas Permeability N$_2$ | O$_2$ | CO$_2$ | Gas Selectivity O$_2$/N$_2$ | CO$_2$/N$_2$ |
|---|---|---|---|---|---|---|
| 6a | 55 | 0.85 | 2.7 | 14 | 3.2 | 16 |
| 6b | 55 | 0.82 | 2.7 | 16 | 3.3 | 20 |
| 6c | 55 | 0.98 | 2.6 | 16 | 2.7 | 16 |
| 6d | 55 | 0.89 | 2.5 | 16 | 2.8 | 18 |

Example 7

Gas permeation properties were measured on the film of Example 2. 7a is the control—without any stability testing. Example 7b is a sample after a 7-day stability test with 27 ppm NO$_2$ in a CO$_2$/N$_2$ mixture, but before stability with 288 SO$_2$ in a CO$_2$/N$_2$ mixture. Example 7c is for the same sample after further 7-day stability test with 288 SO$_2$ in a CO$_2$/N$_2$ mixture. The data shows little effect on gas permeability from these exposures—i.e. the film is stable in the NO$_2$ and SO$_2$ environments.

| Ex. | Temp, ° C. | Gas Permeability N$_2$ | O$_2$ | CO$_2$ | Gas Selectivity O$_2$/N$_2$ | CO$_2$/N$_2$ |
|---|---|---|---|---|---|---|
| 7a | 55 | 0.75 | 2.0 | 13 | 2.7 | 17 |
| 7b | 55 | 0.72 | 1.9 | 13 | 2.6 | 18 |
| 7c | 55 | 0.69 | 1.9 | 13 | 2.8 | 19 |

What is claimed is:

1. A fluoropolymer polymeric media for the separation of carbon dioxide from a mixture with other gases, wherein said media comprises at least 75 weight percent of a) one or more polyvinylidene fluoride (PVDF)-based polymers, wherein said PVDF-based polymers comprise either:
   1) more than 50 mole percent of vinylidene fluoride (VDF) monomer units, or
   2) consist of 10-99 mole percent of vinylidene fluoride monomer units, with 1 to 90 mole percent of monomer units selected from 2,3,3,3-tetrafloropropene, 3,3,3-trifluoropropene,
   b) one or more a polyethylene tetrafluoroethylene (ETFE)-based polymers, wherein said ETFE-based polymers comprise either:
   1) more than 50 mole percent of ethylene tetrafluoroethylene monomer units, or
   2) consist of 10-99 mole percent of ethylene tetrafluoroethylene monomer units, with 1 to 90 mole percent of monomer units selected from 2,3,3,3-tetrafloropropene, 3,3,3-trifluoropropene, or
   c) a mixture of PVDF-based polymers and ETFE-based polymers of a) and b),
   wherein said fluoropolymer media has a selectivity for carbon dioxide over nitrogen (CO$_2$/N$_2$) of at least a factor of 2, and
   wherein said media is in the form of a film having a film thickness of from 100 nm to 25 microns.

2. The polymeric media of claim 1, wherein said media is in the form of a film, a membrane or a powder.

3. The polymeric media of claim 1, wherein said PVDF-based polymer consists of more than 50 to 99 mole percent of VDF and 1 to less than 50 mole percent of monomer units selected from tetrafluoroethylene, hexafluoropropene, and perfluoroethers.

4. The polymeric media of claim 1, wherein said ETFE-based polymer consists of a copolymer having from 70 to 99 mole percent of ETFE monomer units and from 1 to 30 mole percent of monomer units selected from trifluoroethylene, chlorotrifluorothylene, hexafluoropropene, 2,3,3,3-tetrafluoro-propene vinyl fluoride, pentafluoropropene, perfluoromethyl vinyl ether, perflupropyl vinyl ether, and 3,3,3-trifluoropropene.

5. The polymeric media of claim 1, wherein said PVDF or ETFE is amorphous.

6. The polymeric media of claim 1, wherein said media comprises a blend of at least 75 weight percent PVDF or ETFE with one or more acrylic polymers.

7. The polymeric media of claim 2, wherein the film thickness is between 250 nm and 10 microns.

8. The polymeric media of claim 1, wherein the PVDF or PTFE has a melt viscosity of 0.5 to 50 kilo poise as measured by ASTM D3835 at 450° F. at 100 sec$^{-1}$.

9. The polymeric media of claim 1, wherein the $CO_2/N_2$ selectivity is greater than 3.

10. The polymeric film of claim 7, wherein the $CO_2/N_2$ selectivity is greater than 5.

11. A method for separating carbon dioxide from a mixture of other gases comprising the step of contacting said mixture of gases with said fluoropolymer media of claim 1.

12. The method of claim 11, wherein said media is in the form of a film.

13. The method of claim 11, wherein said mixture of gases comprises $SO_x$ and $NO_x$.

14. The method of claim 13, wherein said mixture of gases is generated from the combustion of a fossil fuel.

* * * * *